United States Patent
Cartwright

(10) Patent No.: US 7,654,911 B2
(45) Date of Patent: Feb. 2, 2010

(54) POOL TABLE LEVELING SYSTEM

(76) Inventor: Thomas Cartwright, 10 Perriwinkle Cir., Stuart, FL (US) 34996

( * ) Notice: Subject to any disclaimer, the term of this patent is extended or adjusted under 35 U.S.C. 154(b) by 24 days.

(21) Appl. No.: 11/771,353

(22) Filed: Jun. 29, 2007

(65) Prior Publication Data

US 2008/0009358 A1    Jan. 10, 2008

Related U.S. Application Data

(60) Provisional application No. 60/817,292, filed on Jun. 29, 2006.

(51) Int. Cl.
*A63D 13/00* (2006.01)
*A63D 15/00* (2006.01)
*A63D 15/04* (2006.01)

(52) U.S. Cl. .................. 473/33; 473/11; 473/1
(58) Field of Classification Search .............. 473/1, 473/29, 33, 11; 248/188.1, 188.4, 188.8; 108/116, 176, 129
See application file for complete search history.

(56) References Cited

U.S. PATENT DOCUMENTS

| | | | | |
|---|---|---|---|---|
| 170,059 | A * | 11/1875 | Collender | 473/33 |
| 280,198 | A * | 6/1883 | Ludwig | 473/33 |
| 653,727 | A * | 7/1900 | Zentner | 473/9 |
| 3,059,888 | A | 10/1962 | Lie | |
| 3,080,835 | A * | 3/1963 | Guglielmi | 108/116 |
| 3,190,405 | A | 6/1965 | Squire | |
| 3,661,100 | A * | 5/1972 | Tennant | 108/132 |
| 3,877,702 | A | 4/1975 | Saliger | |
| 4,026,079 | A | 5/1977 | Morris | |
| 4,305,581 | A * | 12/1981 | Neuharth | 473/15 |
| 4,365,803 | A | 12/1982 | Barnes et al. | |
| 4,615,279 | A | 10/1986 | de la Haye | |
| 4,768,781 | A * | 9/1988 | McMillin | 473/16 |
| 5,161,797 | A * | 11/1992 | Frasca | 473/29 |
| 5,323,695 | A | 6/1994 | Borgman et al. | |
| 5,623,792 | A * | 4/1997 | Crumpacker | 52/126.7 |
| 5,746,660 | A * | 5/1998 | Grover | 473/15 |
| 5,845,590 | A | 12/1998 | Seidl | |
| 5,890,438 | A | 4/1999 | Frankish | |
| 5,894,614 | A | 4/1999 | Stroud | |
| 6,132,320 | A * | 10/2000 | Spoerl et al. | 473/29 |
| 6,148,741 | A | 11/2000 | Motta | |
| 6,244,969 | B1 * | 6/2001 | Murphy et al. | 473/29 |
| 6,705,239 | B2 | 3/2004 | Doyle | |
| 6,857,968 | B2 * | 2/2005 | Fallack | 473/33 |
| 6,935,250 | B1 | 8/2005 | Arnold | |
| 7,220,185 | B2 * | 5/2007 | Chen | 473/4 |
| 7,223,177 | B2 | 5/2007 | Tarbell | |
| 7,246,779 | B2 | 7/2007 | Doyle | |
| 2007/0228234 | A1 | 10/2007 | Doyle | |

* cited by examiner

*Primary Examiner*—Mitra Aryanpour
(74) *Attorney, Agent, or Firm*—Thomas R. FitzGerald; Hiscock & Barclay, LLP

(57) ABSTRACT

The invention provides a leveling apparatus that cooperates with a game table leg by vertically translating the leg, wherein the apparatus is actuated near the top of the leg.

8 Claims, 2 Drawing Sheets

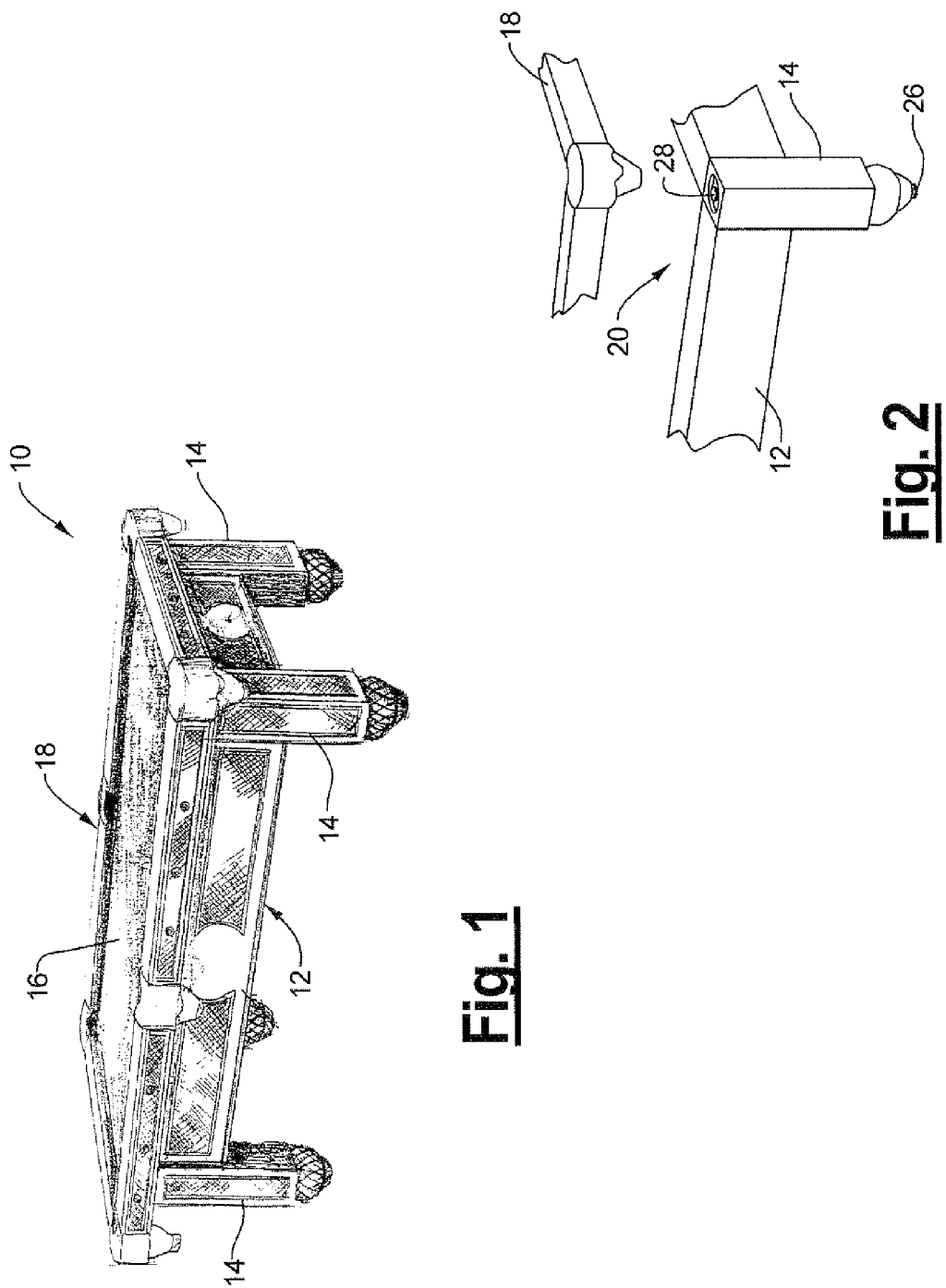

POOL TABLE LEVELING SYSTEM

CROSS-REFERENCE TO RELATED APPLICATIONS

This application claims priority from U.S. Provisional Patent Application Ser. No. 60/817,292, filed Jun. 29, 2006, the disclosure of which is herein incorporated by reference.

FIELD OF THE INVENTION

This invention relates to a mechanical leveling system for use with billiards tables and pool tables.

BACKGROUND OF THE INVENTION

Game tables, such as pool and billiards tables, are generally leveled by one of three conventional methods. In one conventional method, spacers or shims made of wood, metal, or other materials are inserted under the legs or frame to elevate that portion of the table. The shims or spacers are added to the low points of the table until the playing surface on the bed of the table is level. The weight of the table is usually lifted manually. This is a difficult and relatively imprecise leveling method.

In another conventional method taught, for example, by U.S. Pat. No. 4,365,803 (FIG. 7), screws with leveling pads are included on the bottom of the table legs. These pads, or leg levelers, are adjusted up and down by turning the pad on the bottom of the leg until the desired height is achieved to make the table level. Because the leveling pads are on the bottom of the legs, the user must be on the floor to adjust the height of the table. The level, however, is usually placed on the playing surface, which is on top of the table where the user cannot see it from the floor. In a further conventional device taught by U.S. Pat. No. 3,877,702 (FIG. 4), the playing surface is leveled by screws that are turned to raise and lower the table bed frame relative to the table legs such that height of the legs is not adjusted.

What is desired is a pool table leveling system that allows the user to finely raise and lower each leg of the table while in a position in which a level on the playing surface is visible to the user.

SUMMARY OF THE INVENTION

The invention comprises, in one form thereof, a leveling apparatus and method for game tables, such as pool tables, billiard tables, and other tables requiring a level playing surface. A leveling apparatus according to the invention cooperates with each of the table legs to raise or lower each leg as needed to level the playing surface. The leveling apparatus includes a rod extending through the leg to the floor wherein actuation of the rod near the top of the leg translates the leg vertically with respect to the rod.

In one form, the invention includes a game table leveling apparatus comprising a game table leg having a top and a bottom; a foot pad proximate to the bottom of the leg; and a rod engaging the foot pad and extending from the bottom of the leg to the top of the leg.

In another form, the invention includes a game table comprising a game surface supported by a frame; a plurality of rails supported by the frame; a plurality of table legs supporting the frame, each of the table legs having a top and a bottom and a leveling apparatus comprising: a foot pad proximate to the bottom of the leg; and a rod engaging the foot pad and the leg, said rod extending from the bottom of the leg to the top of the leg.

In another form, the invention includes a game table leveling apparatus comprising a game table leg having a top and a bottom, the leg defining a through hole extending from the bottom to the top; an internally-threaded insert coupled to the leg; and a rod having external threads engaging the internal threads of the insert, the rod extending through the through hole from approximately the bottom of the leg to approximately the top of the leg.

In another form, the invention includes a method for leveling a game table. The method comprises the steps of providing a plurality of game table legs, each of the legs having a top and a bottom and comprising a foot pad proximate to the bottom of the leg and a rod engaging the foot pad and the leg, the rod extending from the bottom of the leg to the top of the leg; and translating the foot pad vertically by actuating the rod proximate the top of the leg to level the game table.

An advantage of the present invention is that the installer is able to make adjustments at the top of the leg while viewing a leveling device on the playing surface to bring the table to a level plane. A further advantage is that the installer is not required to bend over or lie on the floor and manually raise the table for leveling.

BRIEF DESCRIPTION OF THE DRAWINGS

The present invention is disclosed with reference to the accompanying drawings, wherein:

FIG. 1 is an isometric view of a game table having a game table leveling system according to the present invention;

FIG. 2 is an isometric view of a game table leg according to the present invention.

Corresponding reference characters indicate corresponding parts throughout the several views. The example set out herein illustrates one embodiment of the invention but should not be construed as limiting the scope of the invention in any manner.

DETAILED DESCRIPTION

Figure 3:
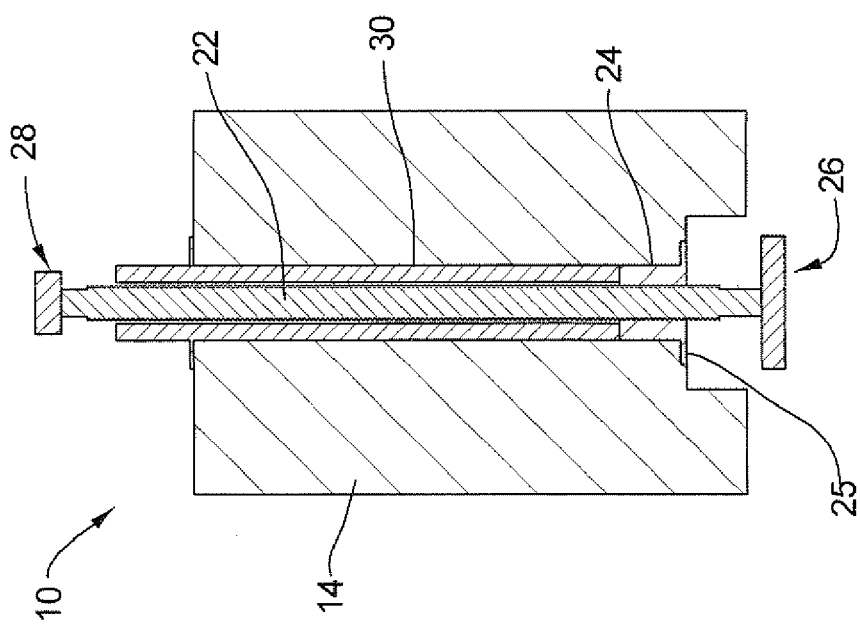
FIG. 3 is a cross-sectional view of a game table leg having a leveling system according to the present invention.

Referring to the figures, the present invention includes a game table leg leveling system. FIG. 1 illustrates a game tables such as a pool table 10, having a frame 12, a plurality of legs 14, a game surface 16, and a rail and pocket assembly 18. Each of the legs 14 includes a leveling apparatus 20, shown for one leg in FIGS. 2 and 3. The apparatus 20 includes a vertical rod 22, inserted through the table leg 14. The rod 22 is threaded and mates with an internally-threaded insert 24 that is coupled to the table leg 14 with fasteners, an interference fit, adhesives, or combinations thereof. The insert 24 may include a flange 25 that is countersunk into the leg 14 to improve the coupling of the insert to the leg. A foot pad 26 engaging the bottom of the threaded rod 12 provides a large surface for contact with the floor. The pad 26 may include a soft material to protect the floor. In a particular embodiment, a recess in the bottom of the leg 14 is deep enough to allow the pad 26 to be withdrawn from the floor.

A knob 28 is located at the top of the rod 22 for turning the rod. The knob 28 may be knurled or otherwise textured for a better grip with fingers or a hand tool. Alternatively, the knob 28 may have a polygonal head, such as a hexagon, for cooperation with a wrench. In a particular embodiment, a guide tube 30 is included as a sleeve for the threaded rod 22. The rod 22, the insert 24, and the guide tube 30 may be made of metal, such as steel, or another suitably sturdy material for supporting a portion of the game table 10. Further, a bushing or a bearing may be included in the guide tube 30 at the end opposite to the threaded insert 24 in order to stabilize the rod 22.

Alternative configurations are readily imagined to accommodate different shapes of the leg 14 or different rail assembly configurations. For example, the rod 22, the knob 28, and the guide tube 30 do not extend above the top of the leg 14, as shown in the embodiment of FIG. 2. A recess defined by the top of the leg 14 provides access to the knob 28.

In use, an installer places one or more carpenter's levels (or other suitable levels) on the frame 12 or game surface 16. Alternatively, one or more levels, such as a spirit levels, are built-in to one or more of the horizontal portions of the frame 12. At this stage, the rail and pocket assembly 18 has not been installed or has been removed. The installer turns the knobs 28 for each of the leveling apparatus 20 to turn the rod 22, raising and lowering the leg 14 via the threaded interface between the rod 22 and the insert 24. The installer monitors the levels and continues adjusting the leveling apparatus 20 until satisfied that the frame 12, the game surface 16, or both are level. The rail and pocket assembly 18 and other components of the table 10 may then be installed.

The ability to raise and lower the table from the top of the leg 14 has the significant advantage of allowing the installer to make adjustments at the top of the leg while viewing a leveling device on the playing surface to bring the table to a level plane. It also keeps the installer from having to bend over or lie on the floor and manually raise the table for leveling.

The embodiments shown in the figures are by way of example. Mechanical means that allow the installer to raise and lower the table leg from the top of the leg are considered within the scope of the invention.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A game table leveling apparatus, comprising:
    a playing surface supported by a plurality of legs;
    a game table leg having a top and a bottom, said top portion of said leg not obscured by the playing surface, said leg defining a through hole extending from the bottom to the top of said leg;
    a cylindrical, elongated rod having one end proximate the top of the table, an elongated external threaded body portion disposed between opposite ends and extending through said through hole, and the other end proximate the bottom of the leg and terminating in a foot pad that bears against a floor to support the leg;
    a hollow cylindrical insert disposed in the through hole, extending the length of the leg and surrounding the rod, said insert fixed to the leg and having an internal thread mated with the elongated external threaded portion of the body of the rod,
    wherein the rod is moveable by rotation with respect to the fixed insert, and
    wherein turning the rod relative to the fixed insert in one direction lowers the leg with respect to the foot pad and turning the rod in the opposite direction raises the leg with respect to the foot pad.

2. The game table leveling apparatus of claim 1, further comprising a knurled knob engaging said rod proximate the top of said leg.

3. The game table leveling apparatus of claim 1, further comprising a knob engaging said rod proximate the top of said leg, the knob being configured for cooperating with a wrench.

4. A game table, comprising:
    a game surface supported by a frame;
    a plurality of rails supported by the frame;
    a plurality of table legs supporting the frame,
    each leg having a top and a bottom, the top portion of each leg not obscured by the game surface, each said leg defining a through hole extending from the bottom to the top of said leg;
    each leg having a cylindrical, elongated rod having one end proximate the top of the table, an elongated external threaded body portion disposed between opposite ends and extending through said through hole, and the other end proximate the bottom of the leg and terminating in a foot pad that bears against a floor to support the leg;
    each leg having a hollow cylindrical insert disposed in the through hole, extending the length of the leg and surrounding the rod, said insert fixed to the leg and having an internal thread mated with the elongated external threaded portion of the body of the rod,
    wherein the rods are moveable by rotation with respect to the fixed inserts, and
    wherein turning the rods relative to the fixed inserts in one direction lowers the legs with respect to the foot pads and turning the rods in the opposite direction raises the legs with respect to the foot pads.

5. The game table of claim 4, further comprising a knurled knob engaging said rod proximate the top of said leg.

6. The game table of claim 4, further comprising a knob engaging said rod proximate the top of said leg, the knob being configured for cooperating with a wrench.

7. A method of leveling a game table, comprising the steps of:
    providing a game surface supported by a plurality of game table legs;
    each leg having a top and a bottom, each leg having a top portion not obscured by the game surface, each said leg defining a through hole extending from the bottom to the top of said leg;
    each leg having a cylindrical, elongated rod having one end proximate the top of the table, an elongated external threaded body portion disposed between opposite ends and extending through said through hole, and the other end proximate the bottom of the leg and terminating in a foot pad that bears against a floor to support the leg;
    each leg having a hollow cylindrical insert disposed in the through hole extending the length of the leg and surrounding the rod, said insert fixed to the leg and having an internal thread mated with the elongated external threaded portion of the body of the rod; and
    translating the legs with respect to the foot pad vertically by actuating the rod proximate the top of the leg to level the game table.

8. The method of claim 7, said foot pad translating step further comprises monitoring a carpenter's level.

* * * * *